UNITED STATES PATENT OFFICE.

HUGH W. COLLENDER, OF NEW YORK, N. Y.

IMPROVEMENT IN BILLIARD-TABLE CUSHIONS.

Specification forming part of Letters Patent No. 23,350, dated March 29, 1859.

*To all whom it may concern:*

Be it known that I, HUGH W. COLLENDER, of the city, county, and State of New York, have invented a certain new and useful Improvement in Billiard-Table Cushions; and I do hereby declare that the following is a full, clear, and exact description thereof.

My invention relates to the method of forming india-rubber cushions for billiard-tables, having the face more dense than the back, such as secured to me by Letters Patent bearing date the 8th day of December, 1857; and my present invention consists in forming such cushions with the back, or part mainly relied upon for the required elasticity, of what is known as the "soft compound of vulcanized india-rubber or allied gum," and with the face next to the cloth of what is known as the "hard compound of vulcanized india-rubber," the two being united while in the green or plastic state and together submitted to the heating or vulcanizing process.

The mode of procedure for the production of my said improved cushions is to mold or otherwise produce, of the required form, the body or rear part of the cushions of that preparation of india-rubber or allied gum which, after being subjected to a high degree of heat, will produce what is known as the "soft compound of vulcanized india-rubber," the preparation of the compound and the heating being according to the process well known to india-rubber manufacturers as the "Charles Goodyear process of vulcanization," preferring for this purpose that proportion of india-rubber and sulphur which manufacturers of india-rubber prefer for the manufacture of compressible springs. And after this has been properly prepared and molded, or otherwise brought to the required form, and while it is in the green or plastic state, I take some of that preparation of india-rubber or allied gum known as the "Nelson Goodyear hard compound," preferring that proportion of gum and sulphur which is usually adopted by india-rubber manufacturers when they desire to impart to that material the spring-like properties of whalebone or steel springs, and after this has been rolled or otherwise brought to a uniform thickness, and while it is in the green or plastic state, I apply it to the face of the soft compound and cause the two to unite by the application of suitable pressure, and then together subject them to the well-known heating vulcanizing process. The material thus prepared is to be applied to billiard-tables in the usual or any other suitable manner.

Cushions thus made will be found to be superior to any other kind of india-rubber cushions with which I am acquainted, as the surface next the cloth covering will present all the advantages due to steel or whalebone springs backed with india-rubber, combined with all the advantages of india-rubber springs; and as the two substances of different degrees of hardness are thus readily and effectually united better results will be obtained than by any kind of combined cushion with which I am acquainted.

I do not wish to be understood as limiting my claim of invention to any special proportion of gum and sulphur to be used in the preparation of the two compounds, as these may be varied at the discretion of the manufacturer so long as the one possesses the characteristic property of the well-known soft compound, and the other of the well-known hard compound.

I do not claim to be the inventor of the process of uniting what is known as the hard and soft compounds of india-rubber and allied gums in the green or plastic state, and then vulcanizing them together that they may be firmly united when vulcanized, as this is a process long since known in the arts; but I am not aware that prior to my invention cushions have ever been so constructed with the view to obtain the spring-like quality of steel on the surface backed with the compressible spring-like property peculiar to what is known as the "soft compound of india-rubber," and with these two properties united as firmly as if the cushion were made of one substance.

What I claim as my invention, and desire to secure by Letters Patent, is—

Making cushions for billiard-tables of what is known as the "soft compound of vulcanizable india-rubber," faced with what is known as the "hard compound of vulcanizable india-rubber or allied gum," united in the green or plastic state, and together subjected to the heating process for vulcanization, substantially as described.

H. W. COLLENDER.

Witnesss:
ANDREW DE LACY,
WM. H. BISHOP.